(12) United States Patent
Kang et al.

(10) Patent No.: US 12,026,644 B2
(45) Date of Patent: Jul. 2, 2024

(54) MACHINE-LEARNING-BASED ADAPTIVE THREADS ORCHESTRATOR DESIGN IN THE MFG-BASED DATA OFFLOADING MECHANISM

(71) Applicant: Toyota Motor Engineering & Manufacturing North America, Inc., Plano, TX (US)

(72) Inventors: Yuhan Kang, Houston, TX (US); Haoxin Wang, Charlotte, NC (US); BaekGyu Kim, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 435 days.

(21) Appl. No.: 17/391,588

(22) Filed: Aug. 2, 2021

(65) Prior Publication Data
US 2023/0035297 A1 Feb. 2, 2023

(51) Int. Cl.
| | |
|---|---|
| G06F 9/46 | (2006.01) |
| G06F 9/54 | (2006.01) |
| G06N 20/00 | (2019.01) |
| G06Q 10/0631 | (2023.01) |
| H04L 67/12 | (2022.01) |

(52) U.S. Cl.
CPC ........ *G06Q 10/06311* (2013.01); *G06F 9/54* (2013.01); *G06N 20/00* (2019.01); *H04L 67/12* (2013.01)

(58) Field of Classification Search
CPC .................................. G06F 9/54; H04L 67/12
See application file for complete search history.

(56) References Cited

U.S. PATENT DOCUMENTS

| | | | |
|---|---|---|---|
| 9,674,113 B2 | 6/2017 | Yousefi et al. | |
| 10,031,784 B2 | 7/2018 | Abdallah | |
| 10,061,627 B2 | 8/2018 | Falco | |
| 2021/0056843 A1 | 2/2021 | Kaur et al. | |
| 2021/0142211 A1 | 5/2021 | Vu et al. | |

FOREIGN PATENT DOCUMENTS

| | | |
|---|---|---|
| WO | 2004021637 A1 | 3/2004 |
| WO | 2008153612 A2 | 12/2008 |

*Primary Examiner* — Gregory A Kessler
(74) *Attorney, Agent, or Firm* — Dinsmore & Shohl LLP

(57) ABSTRACT

A system for coordinating data offloading includes a controller. The controller is configured to at least receive a set of data metrics corresponding to a set of vehicles, generate a set of vehicle clusters based on the set of data metrics, determine a thread distribution based on the set of vehicle clusters, and transmit a data offloading control signal to each of the set of vehicles according to the thread distribution.

20 Claims, 5 Drawing Sheets

MACHINE-LEARNING-BASED ADAPTIVE THREADS ORCHESTRATOR DESIGN IN THE MFG-BASED DATA OFFLOADING MECHANISM

TECHNICAL FIELD

The present disclosure relates to data offloading, and more particularly to systems and methods for multi-threaded data offloading for numerous connected vehicles.

BACKGROUND

Connected vehicles may be connected to the Internet to send and/or receive data to improve the functionality of the connected vehicle. Connected vehicles may also be equipped with cameras and other sensors for perceiving their environment. Existing data offloading mechanisms in edge computing are not efficient and thus struggle to scale to groups of larger than 20 vehicles. Such existing mechanisms typically utilize a single-threaded offloading controller. Single-threaded offloading controllers are especially inefficient when vehicles have data with different latency requirements, different data types, different data generation rates, different user preferences, and any other characteristics that make the data heterogeneous. Moreover, heterogeneity among the data in a large group of vehicles makes optimization of the vehicles' offloading rate very time-consuming.

Therefore, a strategy for coordinating data offloading from connected vehicles that can efficiently scale to large groups of vehicles is desired.

SUMMARY

In accordance with one embodiment of the present disclosure, a system for coordinating data offloading includes a controller. The controller is configured to at least receive a set of data metrics corresponding to a set of vehicles, generate a set of vehicle clusters based on the set of data metrics, determine a thread distribution based on the set of vehicle clusters, and transmit a data offloading control signal to each of the set of vehicles according to the thread distribution.

In accordance with another embodiment of the present disclosure, a method for coordinating data offloading includes receiving a set of data metrics corresponding to a set of vehicles, generating a set of vehicle clusters based on the set of data metrics, determining a thread distribution based on the set of vehicle clusters, and transmitting a data offloading control signal to each of the set of vehicles according to the thread distribution.

Although the concepts of the present disclosure are described herein with primary reference to connected vehicles, it is contemplated that the concepts will enjoy applicability to any data offloading in edge computing environments.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Strategies for addressing the limitation of single-threaded offloading controllers are described in detail herein. Single-threaded offloading controllers are the typical controllers used in edge computing. Such controllers are inefficient and thus ineffective for scaling to large groups of vehicles (e.g., greater than 20 vehicles). Particularly, single-threaded offloading controllers are inefficient because they are utilized for a wide range of offloading requirements such as latency, data types, data generation rates, user preferences, and the like. Optimizing a single-threaded offloading controller for such a wide range of offloading requirements is often time-consuming, and may be better utilized in homogenous, rather than heterogeneous, groups of vehicles. Furthermore, using a multi-threaded offloading controller instead of a single-threaded offloading controller raises the issue of determining the optimal number of threads to be used and how they should be distributed.

To address the foregoing issues of single-threaded offloading controllers and coordinating multiple threads, embodiments of the present disclosure are directed to systems and methods for coordinating data offloading including a multi-threaded mean-field-game-based (MFG-based) offloading controller and a machine-learning-based (ML-based) thread orchestrator to address the inefficiencies of single-threaded offloading. Regarding the controller, "multi-threaded" refers to a model of computer program execution that allows for multiple threads to be created within a process. That is, a single processor can perform multiple tasks at a time, where each task is performed as its own thread. "Mean-field game" refers to a game theory framework that models the interaction of a small group of agents (i.e., the reference agents) with the collective effect of the other agents to approximate the behavior of the group of agents. That is, the reference agents do not care about the interactive impacts from others but rather care about the mass behavior, which helps break down a complex large-scale optimization problem into a family of localized optimization problems. "Machine learning," for purposes of the present disclosure, refers to unsupervised learning that draws inferences from unlabeled input data. For example, clustering is a form of machine learning that divides a set of data into a plurality of groups such that data within each group is more similar than data from other groups.

Figure 1:
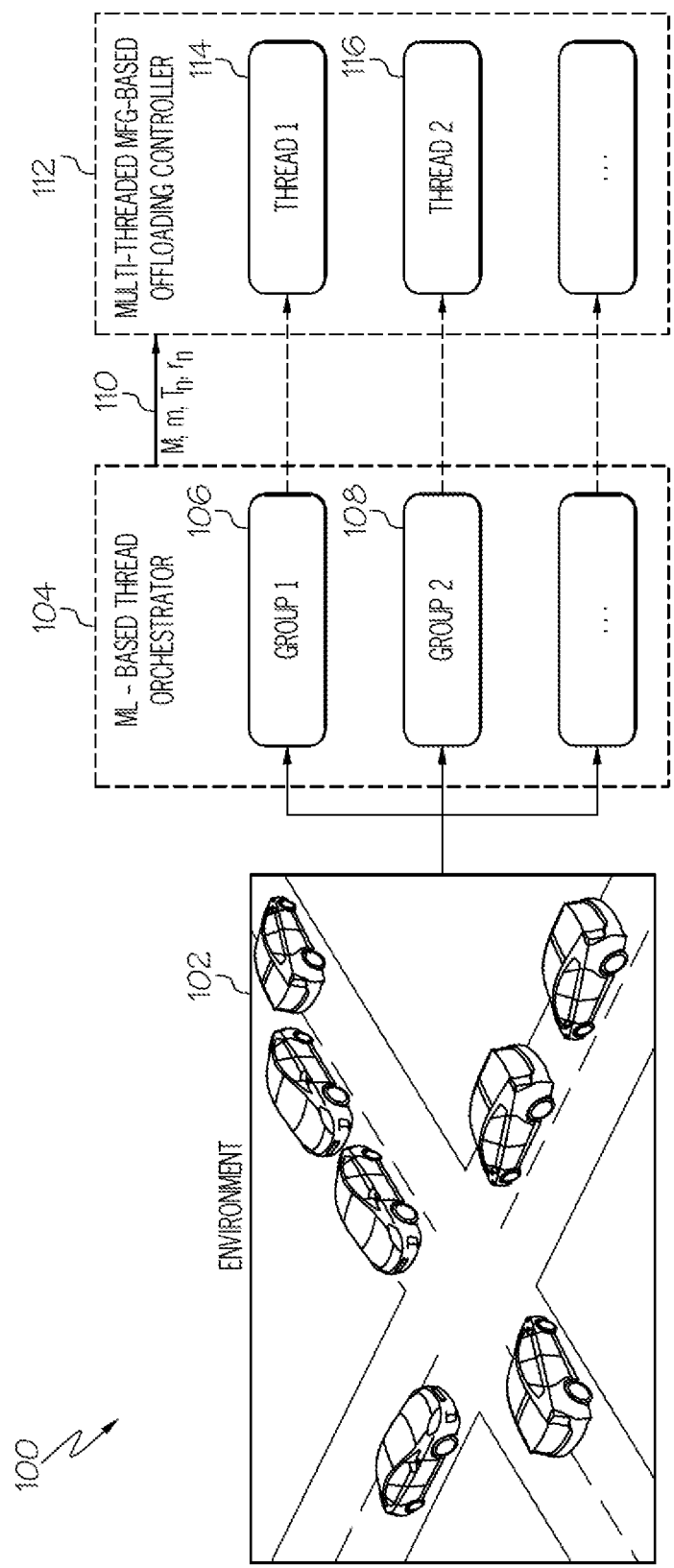
FIG. 1 depicts a workflow between a machine-learning-based thread orchestrator and a mean-field-game-based offloading controller, according to one or more embodiments shown and described herein.

Referring now to FIG. 1, a workflow 100 between an ML-based thread orchestrator 104 and an MFG-based offloading controller 112 is depicted. The workflow 100 includes an environment 102 that is covered by a system engaging in the workflow 100. The environment 102 may include a plurality of connected vehicles. The workflow 100 also includes the system utilizing its ML-based thread orchestrator 104 to divide the plurality of vehicles in the environment 102 into a plurality of groups 106, 108. The groups 106, 108 may send a control signal 110 to a corresponding thread 114, 116 of the multi-threaded MFG-based offloading controller 112.

In the environment 102, it is assumed that the vehicles operate as heterogeneous agents having different edge computing application requests and latency requirements. For the same applications, vehicles may need to offload different types of data with different levels of priority. For different applications, data with the same type may have different latency requirements. Each vehicle may also have a priority level (e.g., VIP, SVIP, etc.) and/or an emergency level. Because of the wide variation of requirements vehicles, it is difficult to optimize offloading with a single-threaded controller, and thus treating the vehicles in the environment 102 as a single group is inefficient.

To break down the problem, the thread orchestrator 104 divides the vehicles of the environment 102 into groups 106, 108. The present disclosure is not limited to any particular number of groups or size of groups. The thread orchestrator 104 may divide vehicles into groups through methods such as clustering. The present disclosure is not limited to the type of clustering algorithm used. The thread orchestrator 104 may receive as input the vehicles in the environment 102 as well as their requirements to generate a plurality of groups 106, 108. The output from the thread orchestrator 104 is sent to the offloading controller 112 via a control signal 110. The present disclosure is not limited to the number of control signals 110 that may be sent from the thread orchestrator 104 to the offloading controller 112. The control signals 110 may include variables such as a number of threads, a thread index, a latency requirement for one or more threads, data generation rate for one or more vehicles in a group 106, 108 assigned to a thread 114, 116, and any other information relating vehicles and groups to threads.

Once the offloading controller 112 has received the control signals 110, the offloading controller 112 can begin to coordinate offloading among the vehicles in one or more of the groups 106, 108. The offloading controller 112 may use known techniques for applying mean-field game theory. Mean-field game theory may be used to break down a large-scale optimization problem into smaller optimization problems where each group 106, 108 may primarily rely on information from the group while also using some information from the vehicles of the environment 102 as a whole. When the offloading controller 112 calculates how offloading should be performed by each vehicle included in the control signals 110, the offloading controller 112 may transmit a data offloading control signal to each vehicle. The data offloading control signal directs the vehicles to offload their data to the system for processing.

Figure 2:
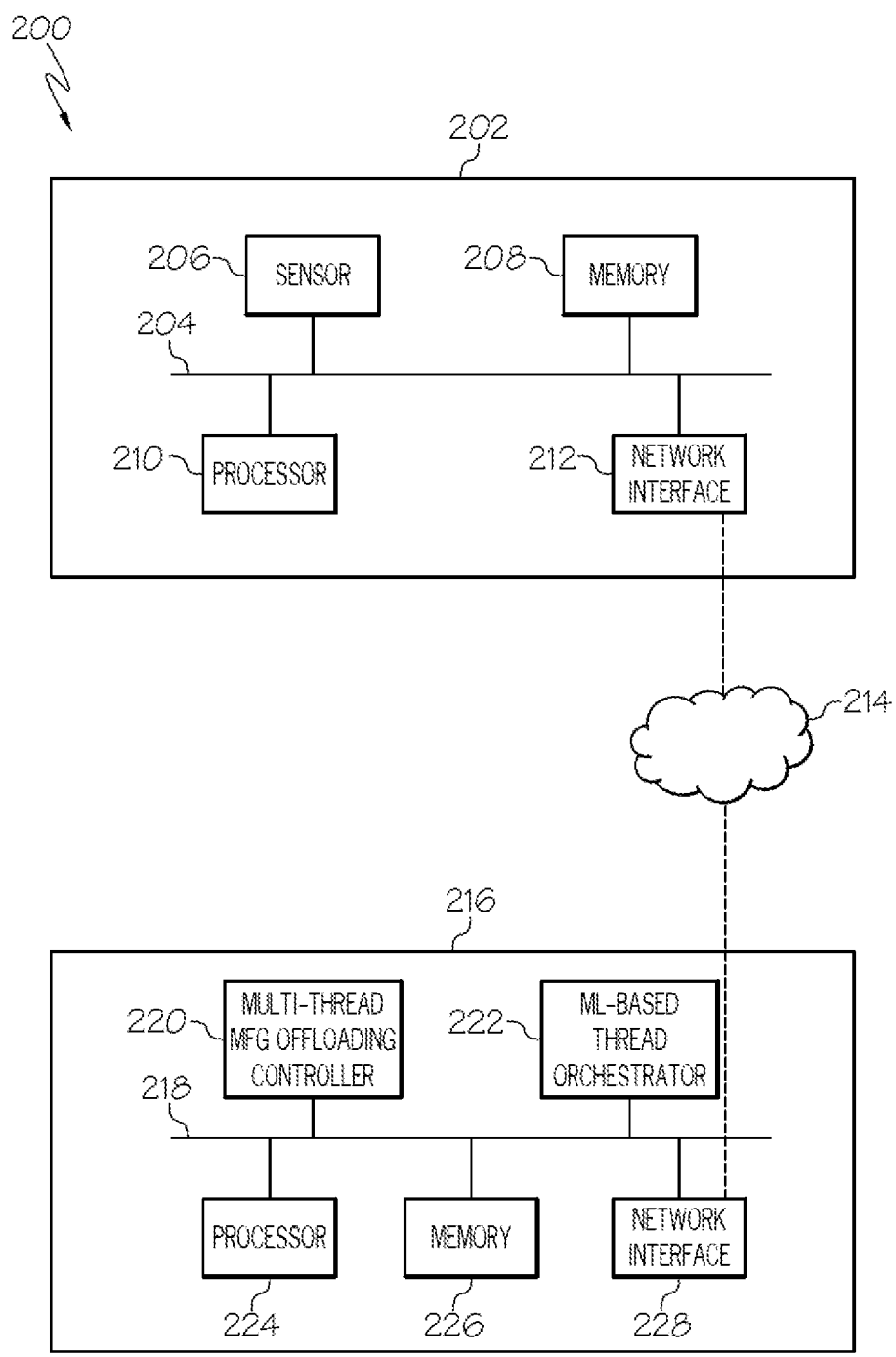
FIG. 2 depicts a schematic diagram of a vehicle and a server, according to one or more embodiments shown and described herein.

Referring now to FIG. 2, a system 200 comprising a vehicle 202 and a server 216 are depicted. The vehicle 202 may include a processor 210, memory 208, sensor 206, and network interface 212. The vehicle 202 may also include a communication path 204 that communicatively couples the various components of the vehicle 202. The vehicle 202 may be a vehicle including an automobile or any other passenger or non-passenger vehicle such as, for example, a terrestrial, aquatic, and/or airborne vehicle.

The processor 210 may include one or more processors that may be any device capable of executing machine-readable and executable instructions. Accordingly, each of the one or more processors of the processor 210 may be a controller, an integrated circuit, a microchip, or any other computing device. The processor 210 is coupled to the communication path 204 that provides signal connectivity between the various components of the vehicle 202. Accordingly, the communication path 204 may communicatively couple any number of processors of the processor 210 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

The communication path 204 may be formed from any medium that is capable of transmitting a signal such as, e.g., conductive wires, conductive traces, optical waveguides, and the like. In some embodiments, the communication path 204 may facilitate the transmission of wireless signals, such as Wi-Fi, Bluetooth®, Near-Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as, e.g., a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 208 is coupled to the communication path 204 and may contain one or more memory modules comprising RAM, ROM, flash memories, hard drives, or any device capable of storing machine-readable and executable instructions such that the machine-readable and executable instructions can be accessed by the processor 210. The machine-readable and executable instructions may comprise logic or algorithms written in any programming language of any generation (e.g., 1GL, 2GL, 3GL, 4GL, or 5GL) such as, e.g., machine language, that may be directly executed by the processor 210, or assembly language, object-oriented languages, scripting languages, microcode, and the like, that may be compiled or assembled into machine-readable and executable instructions and stored on the memory 208. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any computer programming language, as pre-programmed hardware elements, or as a combination of hardware and software components.

The sensors 206 are coupled to the communication path 204 and communicatively coupled to the processors 210. The sensors 206 may include, but are not limited to, LiDAR sensors, RADAR sensors, optical sensors (e.g., cameras) laser sensors, proximity sensors, location sensors (e.g., GPS modules), and the like. In embodiments, the sensors 206 may monitor the surroundings of the vehicle and may detect other vehicles and/or traffic infrastructure.

The network interface 212 includes network connectivity hardware for communicatively coupling the vehicle 202 to the server 216. The network interface 212 can be communicatively coupled to the communication path 204 and can be any device capable of transmitting and/or receiving data via a network 214 or other communication mechanisms. Accordingly, the network interface 212 can include a communication transceiver for sending and/or receiving any wired or wireless communication. For example, the network connectivity hardware of the network interface 212 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices.

The vehicle 202 may connect with one or more other connected vehicles and/or external processing devices (e.g., the server 216) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time- and/or location-based. In embodiments, a connection between vehicles or between a vehicle and an infrastructure may utilize one or more networks to connect which may be in place of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still, other examples include networks using centralized servers and other central computing devices to store and/or relay information between vehicles, such as location information to form groupings.

The vehicle 202 may be communicatively coupled to the server 216 by a network 214. The network 214 may be a wide area network, a local area network, a personal area network, a cellular network, a satellite network, and the like.

The server 216 comprises a processor 224, memory 226, network interface 228, a multi-threaded MFG-based offloading controller 220, an ML-based thread orchestrator 222, and communication path 218. Each component of the server 216 is similar in features to its vehicle 202 counterpart, described in detail above.

The multi-threaded MFG-based offloading controller 220 includes a controller for generating control signals to vehicles that coordinate data offloading. The offloading controller 220 can be communicatively coupled to the communication path 204 and may be one or more controllers, integrated circuits, microchips, or any other computing devices. Additionally or alternatively, the offloading controller 220 may be included within the processors 224. That is, the processors 224 may be configured to operate as an offloading controller 220 or may have a processor dedicated to operating as an offloading controller 220. The offloading controller 220 contains multiple threads for multi-threaded workloads. The offloading controller 220 may also be configured to engage in mean-field game calculations for optimizing how vehicles should offload their data.

The ML-based thread orchestrator 222 may include a controller for generating control signals to the offloading controller 220. The thread orchestrator 222 can be communicatively coupled to the communication path 204 and may be one or more controllers, integrated circuits, microchips, or any other computing device. Additionally or alternatively, the thread orchestrator 222 may be included within the processors 224. That is, the processors 224 may be configured to operate as a thread orchestrator 222 or may have a processor dedicated to operating as a thread orchestrator. The thread orchestrator 222 may receive data metrics from a vehicle 202 as input. Data metrics may include data generation rate, data type, time delay requirement, priority level, emergency level, and any other metric relating to vehicle data. The thread orchestrator 222 may generate as output a set of vehicle clusters based on the set of data metrics. To do so, the thread orchestrator 222 may have a machine learning model that is configured to perform a clustering algorithm on the set of data metrics to generate groups of vehicles. The thread orchestrator 222 may further send the output to the offloading controller 220 in the form of a control signal.

Figure 3:
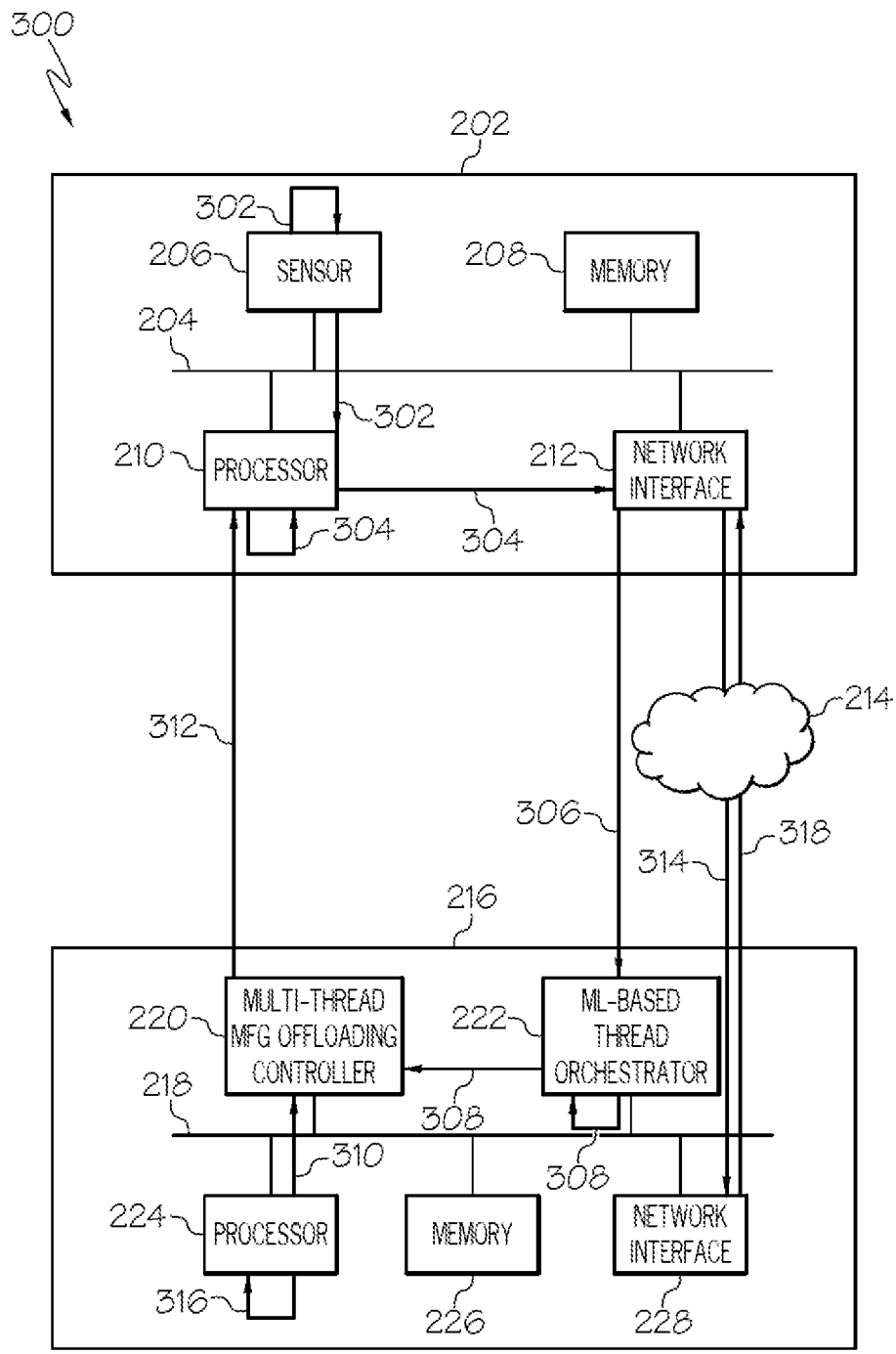
FIG. 3 depicts a workflow between a vehicle and a server, according to one or more embodiments shown and described herein.

Referring now to FIG. 3, a workflow 300 between a vehicle 202 and a server 216 is depicted. Beginning at step 302, the vehicle 202 generates data via the sensors 206. As discussed above, the sensors 206 may include cameras, LIDAR sensors, RADAR sensors, GNSS, Sonar, and the like. The data generated may be uploaded for processing, analysis, sharing, and/or any other data manipulation.

Following data generation, the data may be classified at step 304 by the processor 210. Data classification may comprise analyzing the data, gathered at step 302, to determine a set of data metrics. The data metrics for a vehicle n may include a data generation rate $r_n$, data type $s_n$, time delay requirement $t_n$, priority level $l_n$, emergency level e, and any other metric relating to the vehicle's data.

At step 306, the data metrics are sent from the vehicle 202 to the server 216 via a network 214. Depending on the size of the data metrics being sent, the data metrics may be packetized for transmission over the network 214, wherein the data metrics are broken up into packets for transportation to the server 216 from the vehicle 202 via the network 214.

At step 308, the ML-based thread orchestrator 222 generates a thread distribution. The server 216 receives a set of data metrics corresponding to at least vehicle 202. The data metrics for the vehicle 202 may include a data generation rate r, data type s, time delay requirement r, priority level l, emergency level e, and any other metric relating to the data of the vehicle 202. The data metrics may be received by the network interface 228 of the server 216 via network 214. Once received, the set of data metrics may be stored in the memory 226 of the server 216 for analysis. Threads of the offloading controller 220 may be assigned to a group of vehicles, as shown in FIG. 1. Threads may be used for coordinating data offloading from vehicle 202 and other vehicles within the corresponding group of vehicles. The generation of the thread distribution may be made by the thread orchestrator 222. The generated thread distribution may be packaged into a control signal for the offloading controller 220 comprising [M, m, $T_n$, $r_n$], where M is a number of threads, m is a thread index, $T_m$ is a latency requirement for the m-th thread, and $r_n$ is a data generation rate for the n-th vehicle covered by the m-th thread. Based on the thread distribution, the offloading controller 220 may optimize the offloading rate for a large number of vehicles by utilizing known mean-field-game-based optimization techniques.

At step 310, the offloading controller 220 may receive additional input relating the environment. Additional input may include channel gain and total number of vehicles. Although the offloading controller 220 may perform optimization primarily through local information relating to groups of vehicles as provided by the thread orchestrator 222, some macroscopic information may be utilized to help implement the optimization.

At step 312, the offloading controller 220 may output data offloading control signals to the vehicle 202 as well as the other vehicles. The server 216 may transmit a data offloading control signal according to the thread distribution generated by the thread orchestrator 222. The offloading controller 220 may receive the control signal from the thread orchestrator 222, the control signal including the thread distribution. Although FIG. 3 depicts the data offloading control signal as being sent from the offloading controller 220 to the processor 210, it should be understood that the data offloading control signal may be sent from the network interface 228 of the server 216 to the network interface 212 of the vehicle 202.

At step 314, the vehicle 202 offloads its data. The vehicle 202 offloads its data at a time and manner as determined by the offloading controller 220 to be optimal. e.g., based on the data offloading control signal. The data may be the data as generated by the sensors 206 in step 302. The data may be sent from the network interface 212 of the vehicle 202 to the network interface 228 of the server 216. Depending on the size of the data being sent, the data may be packetized for transmission over the network 214, wherein the data is broken up into packets for transportation to the server 216 from the vehicle 202 via the network 214.

At step 316, the server 216 may process the offloaded data from the vehicle 202 of the set of vehicles. The processing may be performed by the processor 224 of the server 216 to generate a data analysis result. The processing may be any method of using and/or manipulating the data. For example, the data may be image data and the processing performed by the server 216 may accordingly be image recognition, or the data may be traffic data and the processing may accordingly be sharing with other vehicles. The data analysis result may be any kind of response from the server 216 to the vehicle 202 after receiving the data from the vehicle in step 314. For example, the data analysis result may be an object recognized if the processing is image recognition, or the data analysis result may be an acknowledgment of receipt of the data if the processing is data sharing.

At step 318, the server 216 may transmit the data analysis result to the vehicle 202. The method of transmission of the data analysis result to the vehicle 202 may be the same method of transmission of the data to the server 216 as performed in step 314.

Figure 4:
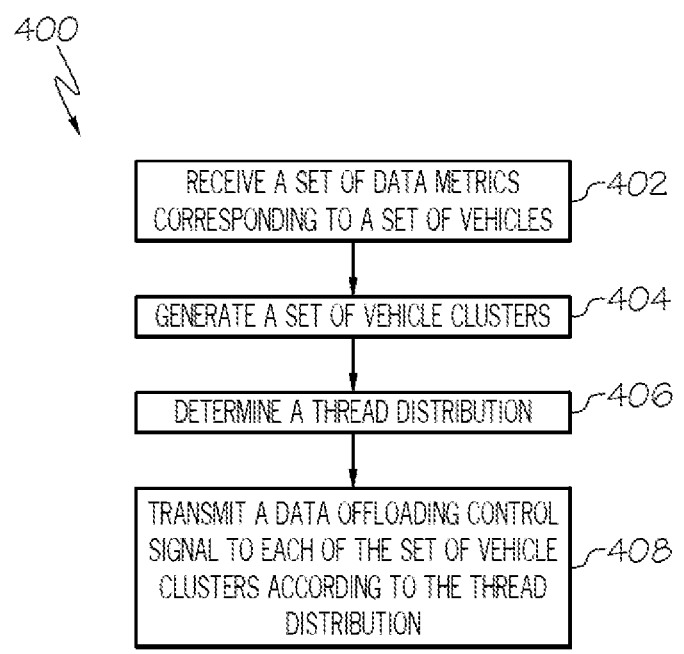
FIG. 4 depicts a flowchart of a method for coordinating data offloading, according to one or more embodiments shown and described herein.

Referring now to FIG. 4, a flowchart 400 of a method for coordinating data offloading with a server is depicted. In the discussion of FIG. 4, reference will be made to FIG. 2. It should be understood that flowcharts depicted and described herein are not limited to the steps included nor to the order of the steps included.

At block 402, the server 216 receives a set of data metrics corresponding to a set of vehicles, including vehicle 202. The data metrics may comprise variables from each vehicle in communication with the server 216. The data metrics for a vehicle n may include a data generation rate $r_n$, data type $s_n$, time delay requirement $t_n$, priority level $l_n$, emergency level e, and any other metric relating to the vehicle's data. The data metrics may be received by the network interface 228 of the server 216 via network 214. Once received, the set of data metrics may be stored in the memory 226 of the server 216 for analysis.

At block 404, the server 216 may generate a set of vehicle clusters. Vehicles in communication with the server 216 may be clustered into groups by a clustering algorithm, such as K-Means clustering. The present disclosure is not limited to a particular type of clustering algorithm. Clustering is an unsupervised machine learning technique that divides the vehicles into groups such that vehicles in the same group are more similar to each other than to vehicles in other groups. The clustering may be performed by the thread orchestrator 222.

At block 406, the server 216 may determine a thread distribution. Threads of the offloading controller 220 may be assigned to a group of vehicles, as shown in FIG. 1. Threads may be used to coordinating data offloading from vehicles within their corresponding group of vehicles. The determination may be made by the thread orchestrator 222. The determined thread distribution may be packaged into a control signal for the offloading controller 220 comprising [M, m, $T_m$, $r_n$], where M is a number of threads, m is a thread index, $T_m$ is a latency requirement for the m-th thread, and $r_n$ is a data generation rate for the n-th vehicle covered by the m-th thread.

At block 408, the server 216 may transmit a data offloading control signal to the vehicle clusters according to the thread distribution generated in block 406. The offloading controller 220 may receive the control signal from the thread orchestrator 222, the control signal including the thread distribution. Based on the thread distribution, the offloading controller 220 may optimize the offloading rate for a large number of vehicles by utilizing known mean-field-game-based optimization techniques.

Figure 5:
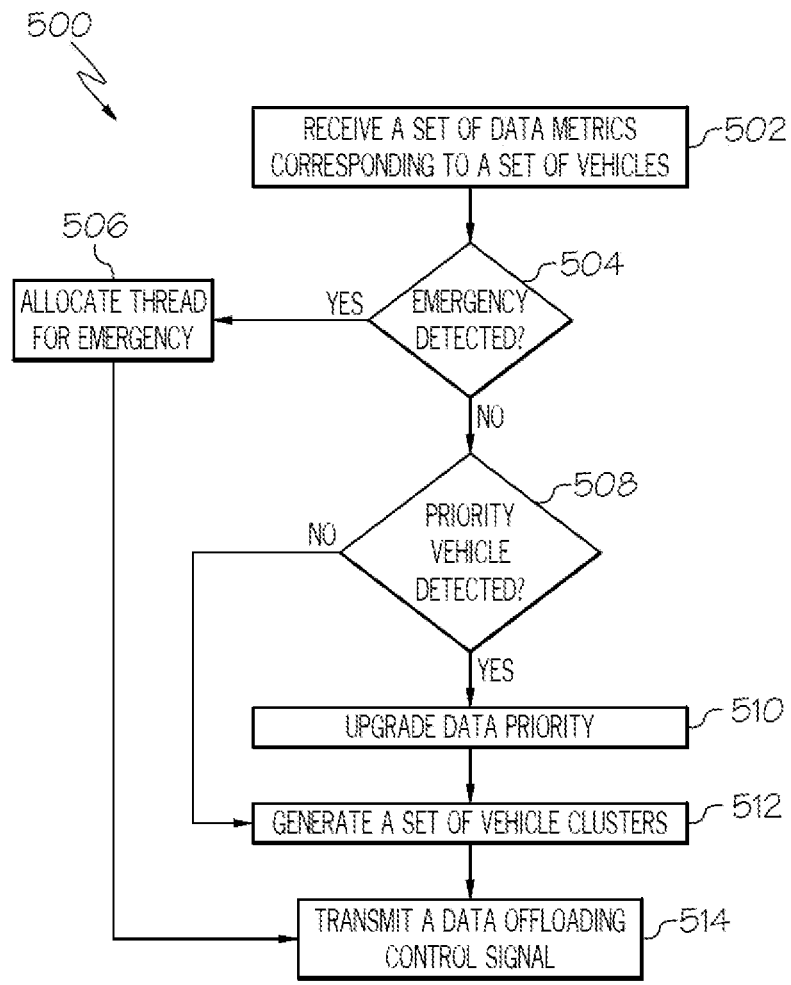
FIG. 5 depicts a flowchart of a method for coordinating data offloading including priority levels, according to one or more embodiments shown and described herein.

Referring now to FIG. 5, a flowchart 500 of a method for coordinating data offloading including priority levels is depicted. Priority levels may be used to account for edge cases in the optimization. There are at least two edge cases: when a vehicle is selected as an important vehicle and when a vehicle is in an emergency. In the discussion of FIG. 5, reference will be made to FIG. 2. It should be understood that flowcharts depicted and described herein are not limited to the steps included nor to the order of the steps included.

At block 502, the server 216 receives a set of data metrics corresponding to a set of vehicles, including vehicle 202. The data metrics may comprise variables from each vehicle in communication with the server 216. The data metrics for a vehicle n may include a data generation rate $r_n$, data type $s_n$, time delay requirement $t_n$, priority level $l_n$, emergency level e, and any other metric relating to the vehicle's data. The data metrics may be received by the network interface 228 of the server 216 via network 214. Once received, the set of data metrics may be stored in the memory 226 of the server 216 for analysis.

At block 504, the server 216 detects an emergency level. The emergency level may be indicated by the input data received from the vehicle 202. The emergency level may be represented in any form. For example, the emergency level may be a numerical scale, a set of categories, a flag, and the like. If an emergency is detected, the process may move to block 506.

At block 506, the thread orchestrator 222 may generate a control signal to the offloading controller 220 to signal to the offloading controller 220 to allocate a thread for each of the emergency events. The offloading controller 220 may allocate extra threads based on the severity of the emergency and/or the number of emergencies. Alternatively, the thread orchestrator 222 may upgrade the data priority level such that data from vehicles experiencing an emergency get offloaded before vehicles not experiencing an emergency. If an emergency is not detected, the process may move to block 508.

At block 508, the server 216 detects a priority vehicle. Priority of a vehicle may be indicated by the input data received from the vehicle 202. The priority may be represented in any form. For example, the priority may be a numerical scale, a set of categories (VIP, SVIP, etc.), a flag, and the like. If a vehicle is determined to be a priority vehicle, the process may move to block 510. Otherwise, the process may proceed to block 512.

At block 510, the thread orchestrator 222 may generate a control signal to the offloading controller 220 to signal to the offloading controller 220 to upgrade a priority level for data corresponding to the priority vehicles, when determining an optimal offloading schedule. Alternatively, the offloading controller 220 may allocate extra threads based on the severity of the degree of priority and/or the number of priority vehicles.

At block 512, the server 216 may generate a set of vehicle clusters via the thread orchestrator 222. Vehicles in communication with the server 216 may be grouped into clusters by a clustering algorithm, such as K-Means clustering. The present disclosure is not limited to a particular type of clustering algorithm. Clustering is an unsupervised machine learning technique that divides the vehicles into groups such that vehicles in the same group are more similar to each other than to vehicles in other groups. The clustering may be performed by the thread orchestrator 222. The server 216 may also determine a thread distribution. Threads of the offloading controller 220 may be assigned to a group of vehicles, as shown in FIG. 1. Threads may be used to coordinating data offloading from vehicles within their corresponding group of vehicles. The determination may be made by the thread orchestrator 222. The determined thread distribution may be packaged into a control signal for the offloading controller 220 comprising [M, m, $T_n$, $r_n$], where M is a number of threads, m is a thread index, $T_n$ is a latency requirement for the n-th thread, and $r_n$ is a data generation rate for the n-th vehicle covered by the m-th thread.

At block 514, the control signal generated by the thread orchestrator 222 may be sent to the offloading controller 220, the offloading controller 220 may receive additional input relating to the environment. Additional input may include channel gain and total number of vehicles, the offloading controller 220 may output data offloading control signals to the vehicle 202 as well as the other vehicles. The server 216 may transmit to the vehicle 202 a data offloading control signal according to the thread distribution generated by the thread orchestrator 222. The offloading controller 220 may receive the control signal from the thread orchestrator 222, the control signal including the thread distribution.

It should now be understood that embodiments described herein are directed to systems and methods for coordinating data offloading with a multi-threaded MFG-based offloading controller and an ML-based thread orchestrator. Systems include a controller configured to receive a set of data metrics corresponding to a set of vehicles, wherein the set of data metrics may include a data generation rate, a data type, a time delay requirement, a user level, an emergency level, or combinations thereof. The controller may also be configured to generate a set of vehicle clusters based on the set of data metrics, wherein generating the set of vehicle clusters may be performed by a machine learning model configured to perform a clustering algorithm on the set of data metrics. The controller may also be configured to determine a thread distribution based on the set of vehicle clusters. Determining a thread distribution may include detecting one or more priority vehicles and generating a control signal to a multi-threaded MFG-based offloading controller to upgrade a priority level for data corresponding to the priority vehicles. Determining a thread distribution may also include detecting one or more emergency events and generating a control signal to a multi-threaded MFG-based offloading controller to allocate a thread for each of the one or more emergency events. The controller may also be configured to generate a control signal to a multi-threaded MFG-based offloading controller, wherein the control signal may include a number of threads, a thread index, a latency requirement of a thread, and/or a data generation rate of a vehicle. The controller may also be configured to transmit a data offloading control signal to each of the set of vehicles according to the thread distribution. The controller may also be configured to receive offloaded data from the set of vehicles according to the data offloading control signal, process the offloaded data from a vehicle of the set of vehicles to generate a data analysis result, and transmit the data analysis result to the vehicle.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open-ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A system for coordinating data offloading comprising:
 a processor configured to:
  receive a set of data metrics corresponding to a set of vehicles;
  generate a set of vehicle clusters based on the set of data metrics;

determine a thread distribution based on the set of vehicle clusters; and transmit a data offloading control signal to each of the set of vehicles according to the thread distribution.

2. The system of claim 1, wherein the set of data metrics comprises a data generation rate, a data type, a time delay requirement, a user level, an emergency level, or combinations thereof.

3. The system of claim 1, wherein generating the set of vehicle clusters based on the set of data metrics is performed by a machine learning model that is configured to perform a clustering algorithm on the set of data metrics.

4. The system of claim 1, wherein determining the thread distribution comprises:

detecting one or more priority vehicles in the set of vehicles; and upgrading a priority level for data corresponding to the priority vehicles in the thread distribution.

5. The system of claim 1, wherein determining the thread distribution comprises:

detecting one or more emergency events; and allocating a thread for each of the one or more emergency events in the thread distribution.

6. The system of claim 1, wherein the processor is further configured to generate a control signal based on the thread distribution.

7. The system of claim 6, wherein the control signal comprises a number of threads, a thread index, latency requirement of a thread, a data generation rate of a vehicle, or combinations thereof.

8. The system of claim 6, wherein the processor is further configured to generate the data offloading control signal based on the control signal.

9. The system of claim 6, wherein the processor is further configured to generate the data offloading control signal further based on a channel gain and a total number of vehicles in the set of vehicles.

10. The system of claim 1, wherein the processor is further configured to receive offloaded data from the set of vehicles according to the data offloading control signal.

11. The system of claim 10, wherein the processor is further configured to: process the offloaded data from a vehicle of the set of vehicles to generate a data analysis result; and transmit the data analysis result to the vehicle.

12. A method for coordinating data offloading comprising:

receiving a set of data metrics corresponding to a set of vehicles;

generating a set of vehicle clusters based on the set of data metrics;

determining a thread distribution based on the set of vehicle clusters; and transmitting a data offloading control signal to each of the set of vehicles according to the thread distribution.

13. The method of claim 12, wherein the set of data metrics comprises a data generation rate, a data type, a time delay requirement, a user level, an emergency level, or combinations thereof.

14. The method of claim 12, wherein generating the set of vehicle clusters based on the set of data metrics is performed by a machine learning model that is configured to perform a clustering algorithm on the set of data metrics.

15. The method of claim 12, wherein determining the thread distribution comprises:

detecting one or more priority vehicles in the set of vehicles; and upgrading a priority level for data corresponding to the priority vehicles in the thread distribution.

16. The method of claim 12, wherein determining the thread distribution comprises:

detecting one or more emergency events; and allocating a thread for each of the one or more emergency events in the thread distribution.

17. The method of claim 12, further comprising generating a control signal based on the thread distribution.

18. The method of claim 17, wherein the control signal comprises a number of threads, a thread index, a latency requirement of a thread; a data generation rate of a vehicle, or combinations thereof.

19. The method of claim 17; further comprising generating the data offloading control signal based on the control signal, a channel gain, a total number of vehicles in the set of vehicles, or combinations thereof.

20. The method of claim 12, further comprising:

receiving offloaded data from the set of vehicles according to the data offloading control signal;

processing the offloaded data from a vehicle of the set of vehicles to generate a data analysis result; and transmitting the data analysis result to the vehicle.

* * * * *